(12) United States Patent
Kumetani

(10) Patent No.: US 10,542,308 B2
(45) Date of Patent: Jan. 21, 2020

(54) CONTENT MANAGEMENT APPARATUS, CONTENT DISPLAY SYSTEM, AND CONTENT RESERVATION METHOD

(71) Applicant: Sharp Kabushiki Kaisha, Sakai, Osaka (JP)

(72) Inventor: Kohji Kumetani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/715,199

(22) Filed: Sep. 26, 2017

(65) Prior Publication Data

US 2018/0091841 A1 Mar. 29, 2018

(30) Foreign Application Priority Data

Sep. 27, 2016 (JP) ................................ 2016-188708

(51) Int. Cl.
*H04N 21/262* (2011.01)
*H04N 21/81* (2011.01)
*G06Q 30/02* (2012.01)

(52) U.S. Cl.
CPC ... *H04N 21/26241* (2013.01); *G06Q 30/0264* (2013.01); *H04N 21/26258* (2013.01); *H04N 21/26283* (2013.01); *H04N 21/812* (2013.01)

(58) Field of Classification Search
CPC ....... H04N 21/26241; H04N 21/26258; H04N 21/26283; H04N 21/812; G06Q 30/0264; G06Q 30/0241; G06Q 30/0275; G06Q 30/02

See application file for complete search history.

(56) References Cited

U.S. PATENT DOCUMENTS

| 10,070,166 | B2* | 9/2018 | Chaar | |
|---|---|---|---|---|
| 2003/0101454 | A1* | 5/2003 | Ozer | G06Q 30/02 725/42 |
| 2005/0289630 | A1* | 12/2005 | Andrews | H04N 21/235 725/116 |
| 2010/0118200 | A1* | 5/2010 | Gelman | G06F 3/041 348/578 |
| 2011/0295700 | A1* | 12/2011 | Gilbane | G06Q 30/00 705/14.71 |
| 2014/0222578 | A1* | 8/2014 | Poornachandran | G06Q 30/0241 705/14.61 |

FOREIGN PATENT DOCUMENTS

JP 2001-236444 A 8/2001

* cited by examiner

*Primary Examiner* — Benjamin R Bruckart
*Assistant Examiner* — Tien M Nguyen
(74) *Attorney, Agent, or Firm* — Keating & Bennett, LLP

(57) ABSTRACT

A content management apparatus manages a content display schedule specifying a time frame for displaying content on a display device. The content management apparatus can reserve to-be-displayed content in an available time frame of the content display schedule. At this time, it is determined whether an attribute of the to-be-reserved content overlaps an attribute of other content in a time frame before or after the time frame where the content is reserved. When the two attributes do not overlap each other, reservation of the content is acceptable.

9 Claims, 13 Drawing Sheets

FIG. 6

| | SUN | MON | TUE | WED | THU | FRI | SAT |
|---|---|---|---|---|---|---|---|
| 1st | | | 1 END | 2 END | 3 END | 4 END | 5 END |
| 2nd | 6 SOLD OUT | 7 SOLD OUT | 8 SOLD OUT | 9 SOLD OUT | 10 RESERVATION AVAILABLE | 11 RESERVATION AVAILABLE | 12 RESERVATION AVAILABLE |
| 3rd | 13 SOLD OUT | 14 SOLD OUT | 15 SOLD OUT | 16 SOLD OUT | 17 SOLD OUT | 18 SOLD OUT | 19 SOLD OUT |
| 4th | 20 SOLD OUT | 21 SOLD OUT | 22 SOLD OUT | 23 SOLD OUT | 24 SOLD OUT | 25 SOLD OUT | 26 SOLD OUT |
| 5th | 27 SOLD OUT | 28 RESERVATION AVAILABLE | 29 RESERVATION AVAILABLE | 30 RESERVATION AVAILABLE | 31 RESERVATION AVAILABLE | | |

FIG. 7

```
              ABC SQUARE ENTRANCE
09:00  ┌─────────────────────────┐
       │ 09:00 - 11:00           │
10:00  │   OVERSEAS TRAVEL       │
       │   COMMERCIAL            │
11:00  ├─────────────────────────┤
       │ 11:00 - 14:00           │
12:00  │   RESTAURANT (CHINESE)  │
       │                         │
13:00  │                         │
       │                         │
14:00  ├─────────────────────────┤
       │ 14:00 - 16:00           │
15:00  │   AVAILABLE             │
       │     ¥100,000            │
16:00  ├─────────────────────────┤
       │ 16:00 - 18:00           │
17:00  │   DEPARTMENT STORE      │
       │                         │
18:00  │                         │
       │                         │
19:00  └─────────────────────────┘
```

FIG. 8

ABC SQUARE ENTRANCE COLUMN (LEFT)

| Time | Content |
|---|---|
| 09:00 | |
| 10:00 | 09:00 - 11:00 OVERSEAS TRAVEL COMMERCIAL |
| 11:00 | |
| 12:00 | 11:00 - 14:00 IDOL CONCERT |
| 13:00 | |
| 14:00 | |
| 15:00 | 14:00 - 16:00 WEDDING HALL |
| 16:00 | |
| 17:00 | 16:00 - 18:00 DEPARTMENT STORE |
| 18:00 | |
| 19:00 | |

ABC SQUARE ENTRANCE COLUMN (CENTER)

| Time | Content |
|---|---|
| 09:00 | |
| 10:00 | 09:00 - 11:00 OVERSEAS TRAVEL COMMERCIAL |
| 11:00 | |
| 12:00 | 11:00 - 14:00 RESTAURANT (CHINESE) |
| 13:00 | |
| 14:00 | |
| 15:00 | 14:00 - 16:00 AVAILABLE |
| 16:00 | |
| 17:00 | 16:00 - 18:00 DEPARTMENT STORE |
| 18:00 | |
| 19:00 | |

ABC SQUARE ENTRANCE COLUMN (RIGHT)

| Time | Content |
|---|---|
| 09:00 | |
| 10:00 | 09:00 - 11:00 OVERSEAS TRAVEL COMMERCIAL |
| 11:00 | |
| 12:00 | 11:00 - 14:00 RESTAURANT (CHINESE) |
| 13:00 | |
| 14:00 | |
| 15:00 | 14:00 - 16:00 NEW FILM INFORMATION |
| 16:00 | |
| 17:00 | 16:00 - 18:00 DEPARTMENT STORE |
| 18:00 | |
| 19:00 | |

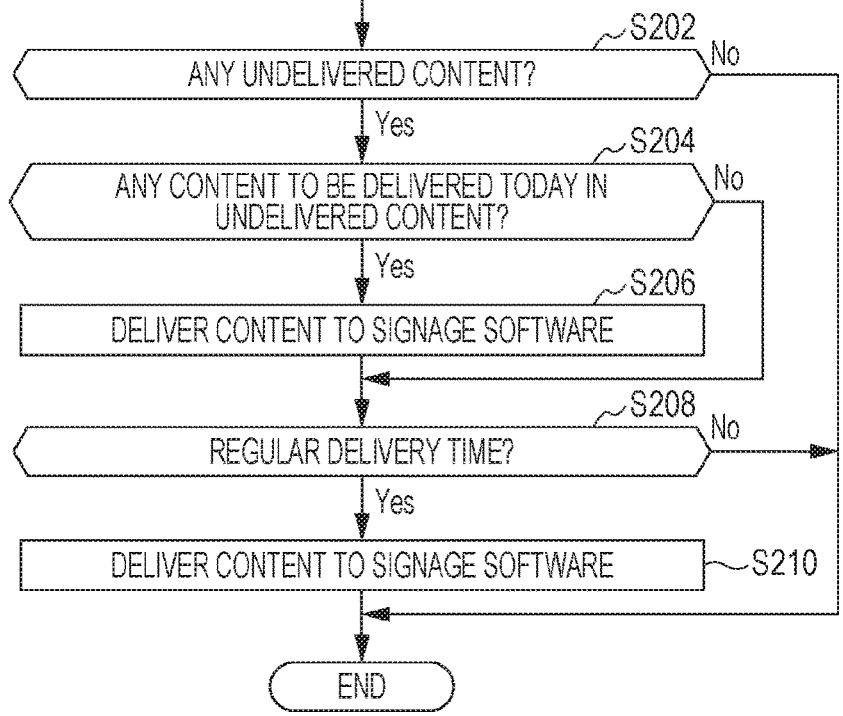
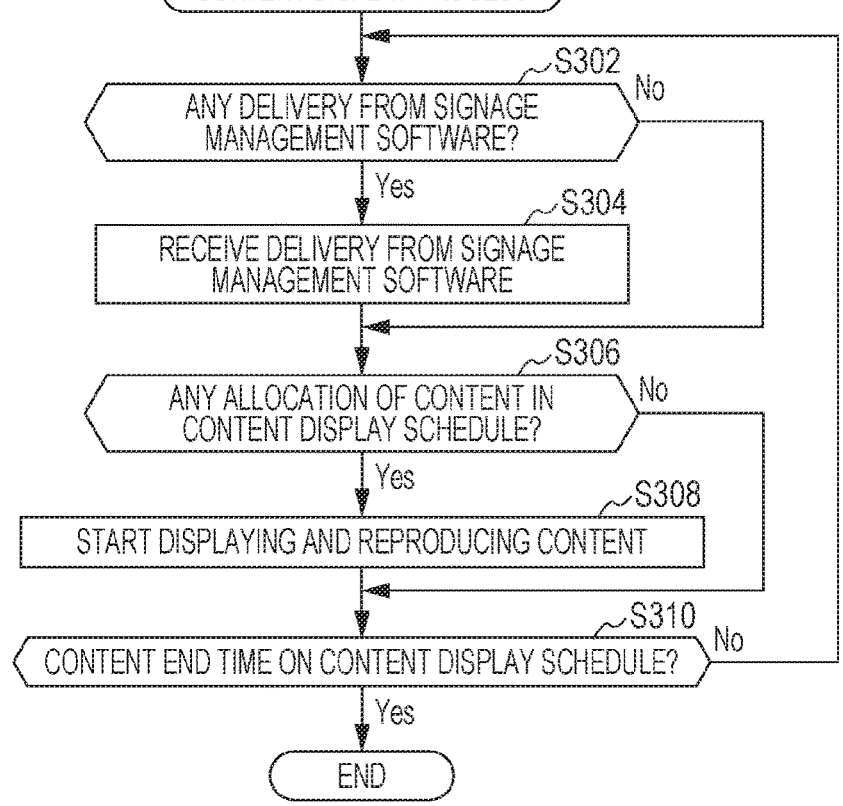

FIG. 12

| SELECTED CATEGORY | TO-BE-EXCLUDED CATEGORY |
|---|---|
| RETAIL STORES | RETAIL STORES (DEPARTMENT STORES/CONSUMER ELECTRONICS RETAIL STORES/ CLOTHING RETAIL STORES) |
| DEPARTMENT STORES | RETAIL STORES (DEPARTMENT STORES/CONSUMER ELECTRONICS RETAIL STORES/ CLOTHING RETAIL STORES) |
| CONSUMER ELECTRONICS RETAIL STORES | RETAIL STORES (DEPARTMENT STORES/CONSUMER ELECTRONICS RETAIL STORES) |
| CLOTHING RETAIL STORES | RETAIL STORES (DEPARTMENT STORES/CLOTHING RETAIL STORES) |
| ALCOHOL | ALCOHOL, EATING PLACES (PUBS) |

FIG. 13

| SELECTED CATEGORY | RESTRICTED TIME SLOT |
|---|---|
| TOBACCO | 09:00 TO 19:00 ON WEEKDAYS/09:00 TO 22:00 ON WEEKENDS |
| ALCOHOL | 09:00 TO 19:00 ON WEEKDAYS |
| PUBS | 09:00 TO 17:00 ON WEEKDAYS/09:00 TO 17:00 ON WEEKENDS |

FIG. 15

ABC SQUARE ENTRANCE COLUMN (LEFT)

| Time | Status |
|---|---|
| 09:00 | 09:00 - 11:00 RESERVATION UNAVAILABLE |
| 10:00 | |
| 11:00 | 11:00 - 14:00 RESERVATION UNAVAILABLE |
| 12:00 | |
| 13:00 | |
| 14:00 | 14:00 - 16:00 RESERVATION UNAVAILABLE |
| 15:00 | |
| 16:00 | 16:00 - 18:00 RESERVATION UNAVAILABLE |
| 17:00 | |
| 18:00 | |
| 19:00 | |

ABC SQUARE ENTRANCE COLUMN (CENTER)

| Time | Status |
|---|---|
| 09:00 | 09:00 - 11:00 RESERVATION UNAVAILABLE |
| 10:00 | |
| 11:00 | 11:00 - 14:00 RESERVATION UNAVAILABLE |
| 12:00 | |
| 13:00 | |
| 14:00 | 14:00 - 16:00 AVAILABLE |
| 15:00 | |
| 16:00 | 16:00 - 18:00 RESERVATION UNAVAILABLE |
| 17:00 | |
| 18:00 | |
| 19:00 | |

ABC SQUARE ENTRANCE COLUMN (RIGHT)

| Time | Status |
|---|---|
| 09:00 | 09:00 - 11:00 |
| 10:00 | RESERVATION UNAVAILABLE |
| 11:00 | 11:00 - 12:00 RESERVATION UNAVAILABLE |
| 12:00 | 12:00 - 14:00 RESERVATION UNAVAILABLE |
| 13:00 | |
| 14:00 | 14:00 - 16:00 RESERVATION UNAVAILABLE |
| 15:00 | |
| 16:00 | 16:00 - 18:00 RESERVATION UNAVAILABLE |
| 17:00 | |
| 18:00 | |
| 19:00 | |

FIG. 16

| TIME AT WHICH RESERVATION IS MADE | FEE (DISCOUNT RATE) |
|---|---|
| TWO OR MORE DAYS | 0% |
| ONE DAY | 10% |
| 12 HOURS | 20% |
| 8 HOURS | 30% |
| 4 HOURS | 40% |
| 2 HOURS | 50% |
| LESS THAN 2 HOURS | 70% |

FIG. 17

ABC SQUARE ENTRANCE

09:00

09:00 - 11:00
OVERSEAS TRAVEL COMMERCIAL

10:00

11:00

11:00 - 14:00
RESTAURANT (CHINESE)

12:00

13:00

¥100,000

14:00

14:00 - 16:00
AVAILABLE
~~¥100,000~~ → ¥60,000

15:00

16:00

16:00 - 18:00
DEPARTMENT STORE

17:00

18:00

19:00

CONTENT MANAGEMENT APPARATUS, CONTENT DISPLAY SYSTEM, AND CONTENT RESERVATION METHOD

BACKGROUND

1. Field

The present disclosure relates to a content management apparatus used in a digital signage system or the like, which controls content, manages a content display schedule, and controls delivery of content to a display device.

2. Description of the Related Art

In recent years, so-called digital signage has been widely spread in places such as station yards and shopping malls where there are a lot of people. Display devices are located in such places to display content such as advertisements.

Business formats in digital signage are as follows: generally, railway companies and location owners (administrators) such as shopping mall administrators install a digital signage system, and sell advertisement spots (time frames in a predetermined time slot) to advertisers, who are the users of the digital signage. Advertisement content or the like is displayed in the advertisement spots.

Delivery of content involves making of an advertisement sequence schedule and a delivery schedule. Some methods have been proposed to make these schedules in advertisement systems of the related art. For example, Japanese Unexamined Patent Application Publication No. 2001-236444 describes a method of preparing attributes that are common among advertisements, adding the quantified attributes to the individual advertisements, and accumulating them in an advertising database (DB) 105. Advertisements whose delivery time slots are not specified in advance are weighted according to each attribute to determine the frequency and sequence of delivery reflecting delivery conditions from the viewpoints of the delivery side and the viewer side, thereby creating an advertisement sequence schedule. Scheduling is performed on advertisements whose delivery time slots and frequency of delivery are specified in advance, thereby creating a delivery time schedule. The above two schedules are combined as a delivery schedule, and, on the basis of the delivery schedule, the advertisements are delivered from the delivery side to the viewer side while paying attention to the time, and the advertisements are displayed on a display on the viewer side.

In a digital signage system, a digital signage system administrator (hereinafter referred to as an administrator) needs to register to-be-displayed content on each display device. Specifically, a schedule for displaying items of content is specified by the administrator, and a set of items of content and a schedule for displaying the items of content is delivered to each display device, which enables the display device to display the items of content in accordance with the schedule.

Therefore, creating a content display schedule as above involves many tasks to be done by the administrator.

In the case of advertisement content in particular, it is of importance that, after a commercial for beer of company A, a commercial of the same attribute, such as beer of company B, be not be displayed consecutively. In the related art, the administrator needs to check these commercials to carefully configure the schedule, and this involves very complicated tasks. The administrator additionally needs to receive content from a plurality of advertisers, and to be aware of the needs of broadcasting frames to determine the schedule, which places a great burden on the administrator.

To increase the operation rate of digital signage serving as business, sales activities may be conducted to eliminate unsold advertisement spots or to reduce the number thereof. However, there is no system for efficiently proposing and selling advertisement spots until the very last minute of the content display schedule, which may let a business chance go by.

In contrast, when an advertisement spot is sold immediately before the content display schedule, the schedule is adjusted and the submitted content is received at the very last minute, which may place a yet heavier burden on the administrator.

Such operational complexity and the heavy burden may cause the administrator's human error, resulting in so-called broadcasting accidents in the digital signage, such as that nothing is displayed, wrong content is displayed, or content is not reproduced to the end and different content is started to be reproduced.

SUMMARY

It is desirable to provide a content management apparatus and the like enabling a purchase order request and submission of advertisement content from an advertiser, and appropriately reserving content.

According to an aspect of the disclosure, there is provided a content management apparatus that manages a content display schedule specifying a time frame for displaying content on a display device. The content management apparatus includes a content reservation unit and an attribute determination unit. The content reservation unit reserves content to be displayed in an available time frame of the content display schedule. The attribute determination unit determines whether an attribute of the to-be-reserved content overlaps an attribute of other content in a time frame before or after the time frame where the content is reserved. The content reservation unit is able to accept reservation of the content when the attribute determination unit determines that the attribute of the content does not overlap the attribute of the other content.

According to another aspect of the disclosure, there is provided a content management apparatus that manages a content display schedule specifying a time frame for displaying content on a display device. The content management apparatus includes a time schedule display unit, a content reservation frame display unit, and a content reservation unit. The time schedule display unit displays a time schedule for displaying content on the display device, on the basis of the content display schedule. The content reservation frame display unit displays, in the time schedule, one or more available time frames in which content to be displayed on the display device can be reserved as one or more reservation-available time frames. The content reservation unit reserves the to-be-displayed content in one of the one or more reservation-available time frames. The content reservation frame display unit does not display a reservation-available time frame when an attribute of the to-be-reserved content overlaps an attribute of other content in a time frame before or after the reservation-available time frame.

According to yet another aspect of the disclosure, there is provided a content display system including a display device and a content management apparatus. The content management apparatus includes a management unit, a content reservation unit, an attribute determination unit, and a transmitter. The management unit manages a content display schedule specifying a time frame for displaying content on the display device. The content reservation unit reserves content to be displayed in an available time frame of the content display schedule. The attribute determination unit determines whether an attribute of the to-be-reserved content overlaps an attribute of other content in a time frame before or after the time frame where the content is reserved. The transmitter transmits the content to the display device in accordance with the content display schedule. The display device includes a content display unit that receives the content and displays the content. The content reservation unit is able to accept reservation of the content when the attribute determination unit determines that the attribute of the content does not overlap the attribute of the other content.

According to a further aspect of the disclosure, there is provided a content reservation method for a content management apparatus that manages a content display schedule specifying a time frame for displaying content on a display device. The method includes: reserving content to be displayed in an available time frame of the content display schedule; and determining whether an attribute of the to-be-reserved content overlaps an attribute of other content in a time frame before or after the time frame where the content is reserved. In the reserving, reservation of the content is acceptable when it is determined in the determining that the attribute of the content does not overlap the attribute of the other content.

According to another aspect of the disclosure, there is provided a content reservation method for a content management apparatus that manages a content display schedule specifying a time frame for displaying content on a display device. The method includes: displaying a time schedule for displaying content on the display device, on the basis of the content display schedule; displaying, in the time schedule, one or more available time frames in which content to be displayed on the display device can be reserved as one or more reservation-available time frames; and reserving the to-be-displayed content in one of the one or more reservation-available time frames. In the displaying one or more available time frames, a reservation-available time frame is not displayed when an attribute of the to-be-reserved content overlaps an attribute of other content in a time frame before or after the reservation-available time frame.

BRIEF DESCRIPTION OF THE DRAWINGS

FIG. 6 is a diagram for describing an exemplary operation (calendar schedule) according to the first embodiment;

FIG. 7 is a diagram for describing an exemplary operation (time schedule) according to the first embodiment;

FIG. 8 is a diagram for describing an exemplary operation (time schedules) according to the first embodiment;

FIGS. 9A to 9C are diagrams for describing an exemplary operation according to the first embodiment;

FIG. 10 illustrates an operation flow for describing a content delivery process according to the first embodiment;

FIG. 11 illustrates an operation flow for describing a content display process according to the first embodiment;

FIG. 12 is a diagram for describing an exemplary data configuration of a to-be-excluded table according to a second embodiment;

FIG. 13 is a diagram for describing an exemplary data configuration of a time restriction table according to a third embodiment;

FIG. 15 is a diagram for describing an exemplary operation (time schedules) according to the fourth embodiment;

FIG. 16 is a diagram for describing an exemplary data configuration of a discount rate table according to a fifth embodiment; and FIG. 17 is a diagram for describing an exemplary operation (time schedule) according to the fifth embodiment.

DESCRIPTION OF THE EMBODIMENTS

Hereinafter, embodiments will be described with reference to the drawings. In the embodiments, a digital signage system including a content management apparatus according to the present disclosure will be described by way of example.

1. First Embodiment
1.1 Overall Configuration

Figure 1:
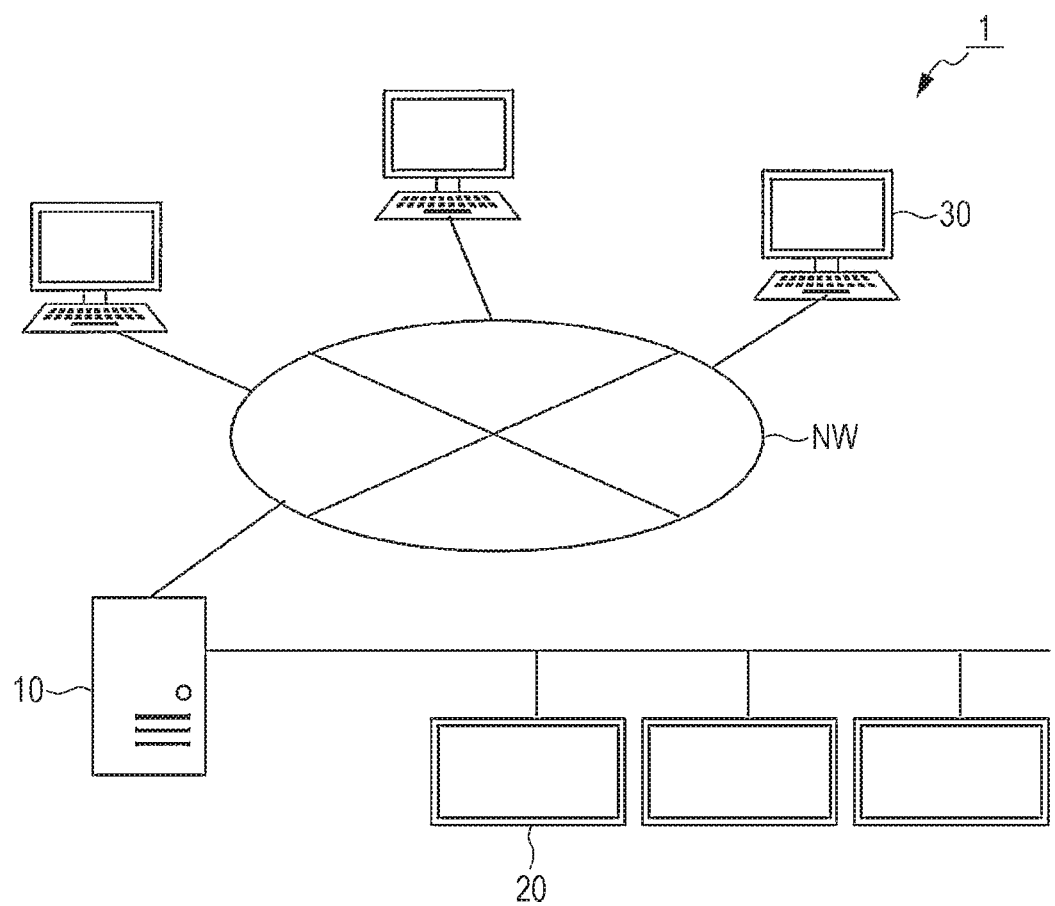
FIG. 1 is a diagram for describing the outline of a digital signage system according to a first embodiment.

At first, the overall configuration of a digital signage system 1 according to a first embodiment will be described on the basis of FIG. 1. Referring to FIG. 1, a display device 20 is connected to a management server 10 in the digital signage system 1. A plurality of display devices 20 may be connected to the management server 10, as illustrated in FIG. 1. Although FIG. 1 illustrates that the display devices 20 are connected to the management server 10 via the same network, each of the display devices 20 needs to be connected to the management server 10 via a network.

The management server 10 is connected to an external network NW, and a terminal device 30 is connected to the management server 10 via the external network NW. One or more terminal devices 30 are connectable, and are used by people who wish to delivery content, such as advertisers.

A device such as a computer may serve as the terminal device 30, or an information processing apparatus such as a smartphone or a tablet computer may serve as the terminal device 30. An apparatus dedicated for content delivery may serve as the terminal device 30, or an image forming apparatus with a communication function may serve as the terminal device 30. That is, any device may serve as the terminal device 30 as long as it establishes connection with the management server 10 to specify content delivery or upload content.

Here, the basic flow in the digital signage system 1 according to the present embodiment is as follows.

(1) Basic advertising contract between the advertiser (content provider who is the operator of the terminal device 30) and the location owner (administrator of the management server 10).

The basic advertising contract to be exchanged is only about the collection method and credit control, and need not include basic information regarding digital signage (such as the display time slot, number of times content is displayed, display time, fee, etc.).

(2) The advertiser establishes connection with the management server 10 provided by the location owner (in a state where identification (ID) and password are secure) and performs operations.

The advertiser checks any available frame displayed on the location owner's signage system, its fee, and the product category of time slots before and after the available frame (including a nearby display system displaying content at the same time).

(3) When the advertiser wishes to purchase the available frame, the advertiser selects the category name of content (such as advertisement content in the present embodiment) through digital signage software (a signage management program running on the management server 10).

(4) At this time, the digital signage software performs an exclusion process when there is the same category in a time slot before or after the frame of interest (and a nearby display system displaying content at the same time).

If the advertisement content of interest is to be excluded, submission of the advertisement content is not permitted.

(5) The advertiser submits the advertisement content to the location owner's server.

(6) In the processing from (3) to (5), a calendar schedule and a daily time schedule are automatically formed. Additionally, because basic information (such as the display time slot, the number of times content is displayed, display time, fee, etc.) can be determined by this UI, basic information need not be contracted in advance at the time of (1).

(7) The management server 10 delivers the "calendar schedule, time schedule, and advertisement content" to a system (including the display device 20 and the like) at the actual location through a network or universal serial bus (USB) memory. The display system displays the advertisement content on the basis of each schedule.

Regarding the time point at which delivery is performed from the management server 10 to the display device 20, items of content may be collectively delivered at night in which the network is relatively not busy (when the signage is not operating) if the items of content are not scheduled to be delivered on the day, or, if content is scheduled to be delivered on the day, the content may be immediately delivered.

1.2 Functional Configuration

Next, the functional configuration of the management server 10 and the display device 20 will be described. Because the terminal device 30 may be any information processing device such as a computer with a communication function as described above, description of the functional configuration of the terminal device 30 will be omitted.

1.2.1 Management Server

Figure 2:
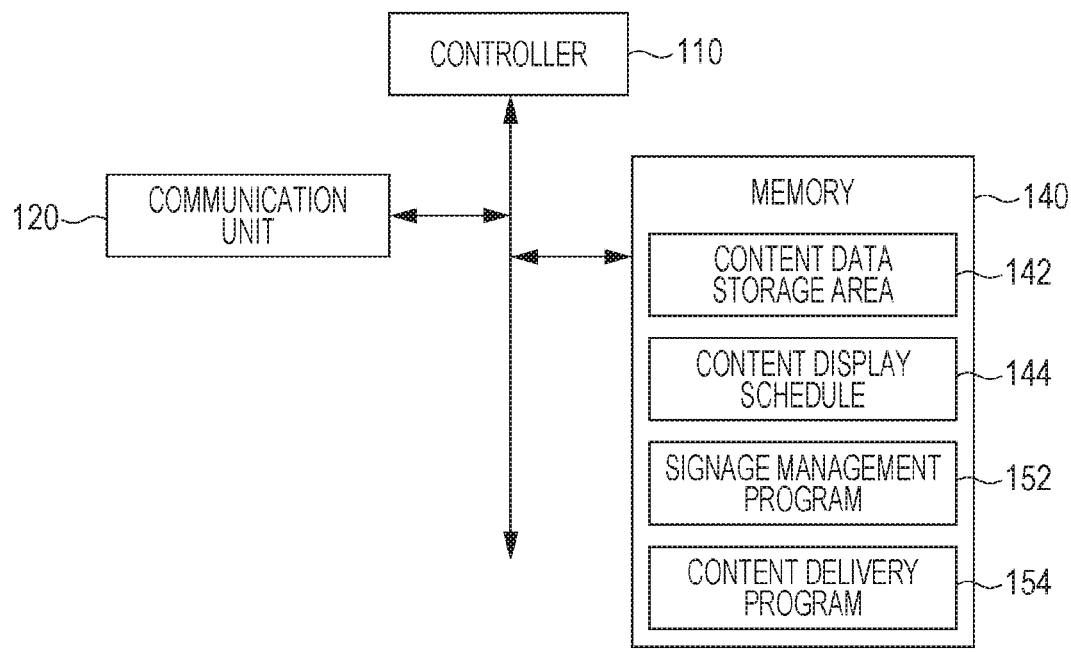
FIG. 2 is a diagram for describing the functional configuration of a management server according to the first embodiment.

The functional configuration of the management server 10 will be described on the basis of FIG. 2. The management server 10 includes a controller 110, a communication unit 120, and a memory 140.

The controller 110 is a function unit for controlling the entire management server 10. The controller 110 realizes various functions by reading and executing various programs stored in the memory 140, and includes, for example, a central processing unit (CPU).

The communication unit 120 is a function unit for performing communication with another apparatus. The communication unit 120 is, for example, a function unit capable of performing communication using a wired local area network (LAN), or a function unit capable of performing communication using a wireless LAN. The communication system may be, for example, Ethernet (registered trademark) or Institute of Electrical and Electronics Engineers (IEEE) 802.11a/b/g/n, or may be a communication network such as Long-Term Evolution (LTE) (registered trademark) or Worldwide Interoperability for Microwave Access (WiMAX).

The memory 140 is a function unit that stores various programs and various items of data involved in the operation of the management server 10. The memory 140 includes, for example, semiconductor memory or a hard disk drive (HDD).

Here, the memory 140 stores an area for a content data storage area 142 that stores content data. Additionally, the memory 140 stores a content display schedule 144, a signage management program 152, and a content delivery program 154.

The content data storage area 142 stores content data submitted (uploaded) from the terminal device 30, for example. In the present embodiment, the type of content is advertisement content by way of example; however, the type of content may include other types of content (such as introductory content and program content). The types of content may additionally include moving images and still images.

The content display schedule 144 stores a content display schedule, which is a schedule for displaying content on the display device 20. For example, the content display schedule 144 displays on which device and at which time content to be delivered from the management server 10 to the display device 20 will be displayed. By transmitting the content display schedule 144 to each display device 20, the display device 20 can display content in accordance with the schedule.

Here, a content display schedule is tabulated information (in the form of a database (DB)) regarding content, such as a time slot (year, month, and day) where the actual signage is displayed, start time, end time, and content name allocated to the time slot.

The signage management program 152 is read and executed by the controller 110 to realize a signage management function. The content delivery program 154 is read and executed by the controller 110 to realize a content delivery function.

1.2.2 Display Device

Figure 3:
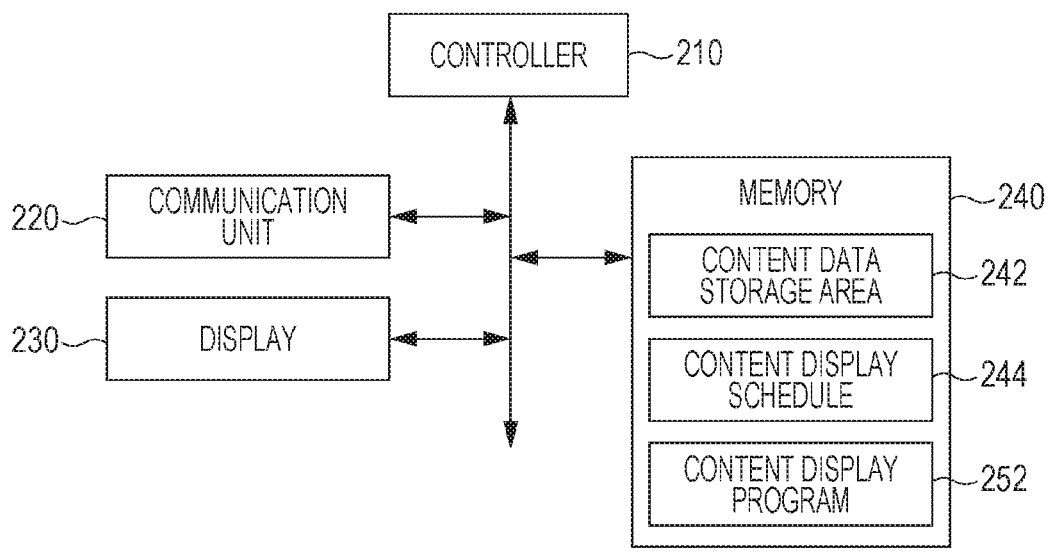
FIG. 3 is a diagram for describing the functional configuration of a display device according to the first embodiment.

The functional configuration of the display device 20 will be described on the basis of FIG. 3. The display device 20 is a set of systems for actually displaying digital signage at an installed location, and includes a controller 210, a communication unit 220, a display 230, and a memory 240.

The controller 210 is a function unit for controlling the entire display device 20. The controller 210 realizes various functions by reading and executing various programs stored in the memory 240, and includes, for example, a CPU.

The communication unit 220 is a function unit for performing communication mainly with the management server 10. The communication unit 220 is, for example, a function unit capable of performing communication using a wired LAN, or a function unit capable of performing communication using a wireless LAN. The communication system may be, for example, Ethernet (registered trademark) or IEEE 802.11a/b/g/n, or may be a communication network such as LTE (registered trademark) or WiMAX.

The display 230 is a function unit for displaying content. The display 230 includes, for example, a liquid crystal display (LCD), an organic electroluminescence (EL) display, or a projector.

The memory 240 is a function unit that stores various programs and various items of data involved in the operation of the display device 20. The memory 240 includes, for example, semiconductor memory or an HDD.

The memory 240 secures an area for a content data storage area 242 for storing delivered content data. The memory 240 additionally stores a content display schedule 244 and a content display program 252.

The content data storage area 242 is an area for receiving and storing content delivered by the management server 10. Content data may be delivered each time, or items of content data may be collectively delivered. Alternatively, content data may be prepared on the display device 20 side, like a screen saver.

The content display schedule 244 stores a content display schedule received from the management server 10. The display device 20 displays content data in accordance with the content display schedule 244.

The content display program 252 is read and executed by the controller 210 to realize a content display function.

The terminal device 30 may be a device integrated as a system, as has been described above. Alternatively, the terminal device 30 may be a computer and a display, or may be realized by an information processing apparatus such as a smartphone or a tablet computer.

1.3 Flow of Processes

Next, the flow of processes according to the present embodiment will be described.

1.3.1 Signage Management Process

Figure 4:
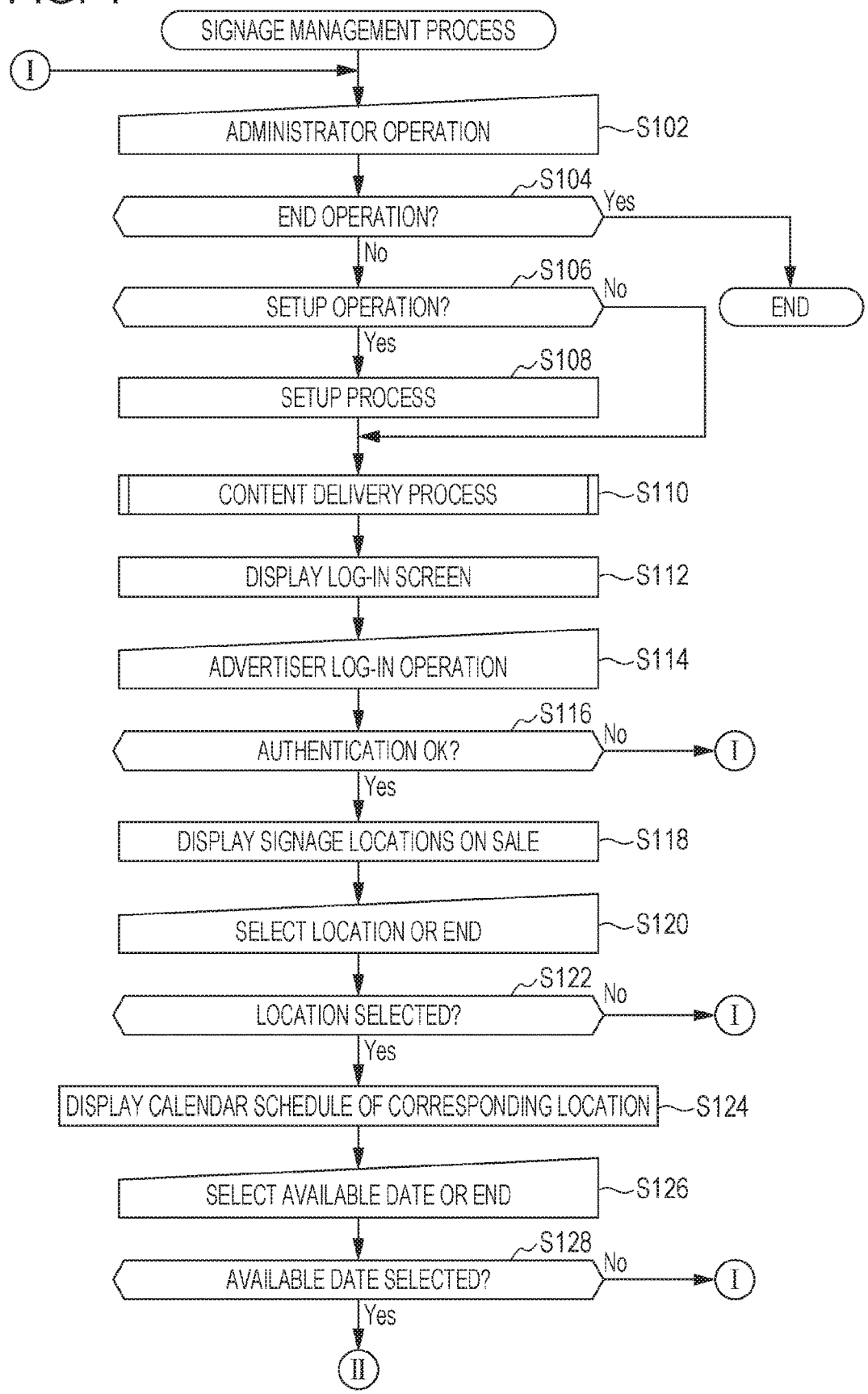
FIG. 4 illustrates an operation flow for describing a signage management system according to the first embodiment.
Figure 5:
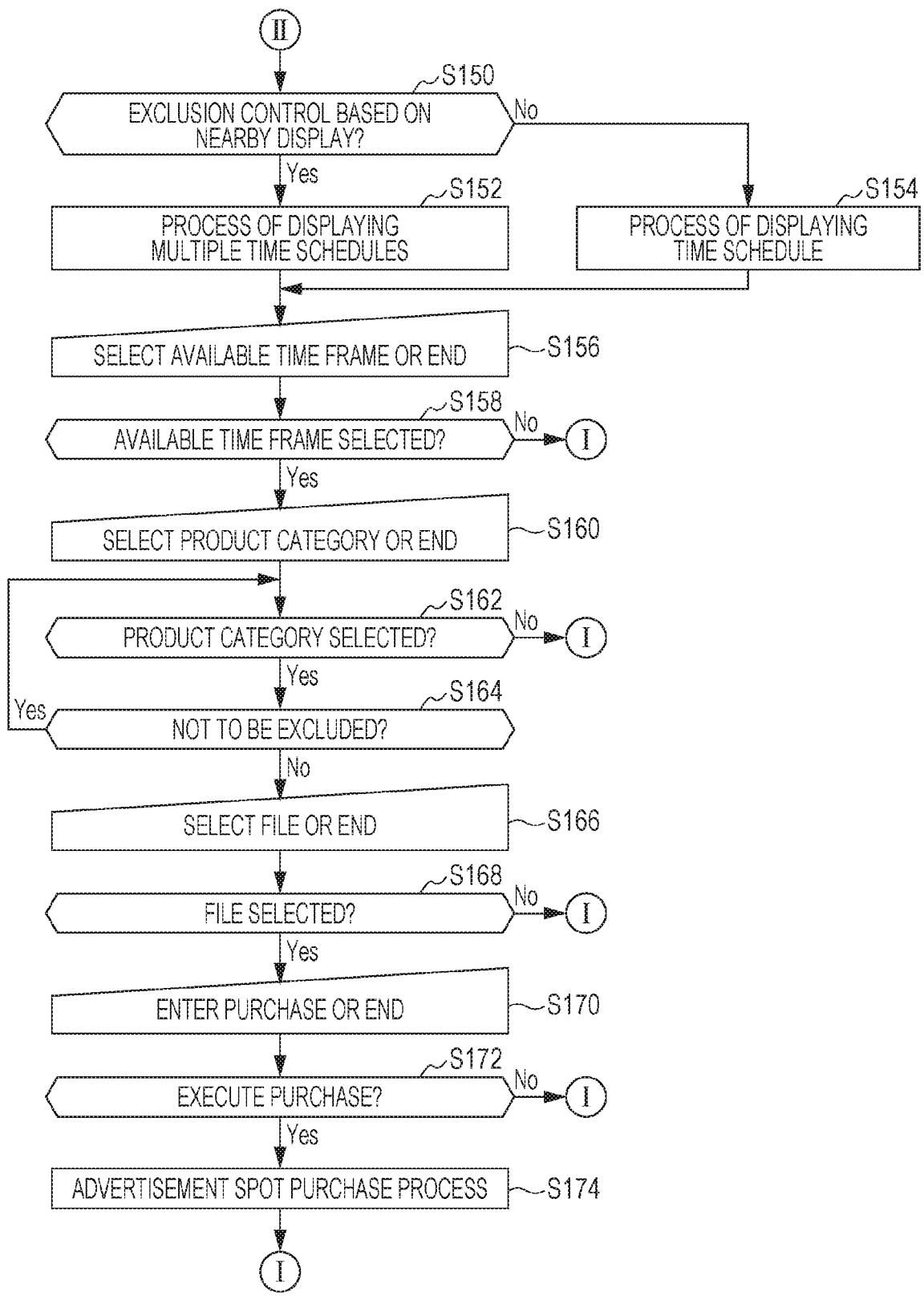
FIG. 5 illustrates an operation flow for describing the signage management system according to the first embodiment.

FIGS. 4 and 5 are flowcharts describing a signage management process. The signage management process is a process realized by reading and executing the signage management program 152 by the controller 110.

At first, when the administrator, who is the location owner, performs an operation (step S102), the process determines whether the operation is an end operation (step S104). The end operation is a power off operation or an operation to end the program. When such an operation is performed, the process ends (YES in step S104).

When the administrator's operation is a setup operation, a setup process is executed (YES in step S106 to step S108). The setup process may set various items of information, such as the setup of the display device 20 (the setup of a location where the display device 20 is installed, Internet Protocol (IP) address of the display device 20, etc.), the setup of user information, and the setup regarding fee information.

Next, a content delivery process is executed (step S110). By executing the content delivery process, content data and a content display schedule are delivered to the display device 20. The operation in the content delivery process will be described later.

A pre-contractor of the digital signage system 1 logs in, and in turn becomes able to perform setup for content registration and delivery. Hereinafter, the process from step S112 onward, which is from a log-in screen onward, will be described.

The log-in screen is displayed (step S112). The log-in screen may be displayed by specifying an address (such as a log-in Uniform Resource Locator (URL)) in the management server 10, or by performing a log-in operation. The process proceeds to the log-in screen using any method, and the log-in screen is displayed on the terminal device 30.

Here, the user (advertiser) performs a log-in operation (step S114). Specifically, the user enters an ID and password, and, when the entered ID and password match those registered, it is determined that the authentication is successful (YES in step S116). Various methods are conceivable as the log-in method. For example, besides the above-described basic authentication method, any method such as OAuth, certificate authentication, or biometrics authentication is usable. Here, when the authentication is not successful or when time runs out, the process is repeated from the beginning.

Next, the management server 10 displays the locations of display devices 20 on sale (signage locations) to allow the user (advertiser) to select. The user can check the locations of display devices 20 on which a time frame (advertisement spot) for displaying content can be purchased. Specifically, locations such as "ABC square entrance column (center)" and "Shopping mall front entrance" are displayed, and the user can select one from the displayed locations.

When the user selects the location of a display device (location of signage), a calendar schedule of a display device 20 located at a corresponding location is displayed (step S124). The calendar schedule is used for displaying, in the form of a calendar, whether content can be reserved or not in accordance with a content display schedule of content data managed by the management server 10. Although it is described in the present embodiment that a calendar schedule can be created on the basis of a content display schedule, a calendar schedule may be separately stored as a calendar schedule.

Here, a calendar schedule is data that can be created from a content display schedule. When used as a user interface (UI), a calendar schedule is displayed as an image of a one-month calendar to indicate whether each frame on sale is available or already sold.

An exemplary screen that is displayed will be described on the basis of FIG. 6. FIG. 6 is a diagram illustrating an exemplary screen of a calendar schedule visible from the user. Here, days 1 to 5 are days that have gone by and are not on sale.

Days 10 to 12, and 28 to 31 are available; when one of these days is selected, the screen proceeds to a time schedule screen. When there is no nearby display device and the location is isolated, the screen proceeds to a time schedule for checking whether a time frame of interest is to be excluded in accordance with time frames before and after the time frame of interest. When there is a nearby display device, the screen proceeds to a time schedule for checking whether a time frame of interest is to be excluded additionally in accordance with the nearby display device. Days 6 to 9 and 13 to 27 are unavailable.

Here, a time schedule is data that can be created from a content display schedule. When used as a UI, a time schedule is displayed as an image of one day to indicate in which time frame content will be displayed, and whether each frame on sale is available.

In the present embodiment, display devices within a certain range can be set as an advertisement group. An advertisement group includes display devices that are within the same field of view of a consumer who views content and checks advertisement content, display devices that are within the same facility, or display devices that are arranged side by side. Such display devices are grouped by the administrator in order to ensure that a competitor's advertisement will not be displayed on display devices that are within the same field of view of a consumer.

Generally, a display device near the display device (a nearby display device) is set. A nearby display device is a display device that is within the same field of view of a user, as has been described above.

Although such grouping is generally set by the administrator, grouping may be automatically set using the distance between installed locations or using IP addresses. The present embodiment will discuss the case where nearby display devices are set as an advertisement group.

Although the same advertisement may be displayed on display devices set as an advertisement group, it may be only necessary to ensure that a competitor's advertisement will not be displayed on the display devices set as an advertisement group, as has been described above. Additionally, an advertisement group may be hierarchically specified.

For example, it is assumed that a plurality of display devices is located at each of a first entrance and a second entrance of a facility. In this case, the plurality of display devices located at the first entrance is set as a first advertisement group, and the plurality of display devices located at the second entrance is set as a second advertisement group.

Furthermore, the first advertisement group and the second advertisement group may be set as a third advertisement group. In this case, for example, control may be applied to display the same advertisement on the first and second advertisement groups, and not to display a competitor's advertisement on the third advertisement group.

Referring back to the process illustrated in FIG. 4, an available date is selected or an end operation is selected (step S126). When an end operation is selected here, the process returns to the beginning (NO in step S128).

In response to selection of an available date (YES in step S128), the process proceeds to a process of displaying one or more time schedules (steps S150 to S154 in FIG. 5). A time schedule is displayed on the basis of a content display schedule to enable the user to check the content reservation circumstances on a daily basis on each display device 20. Although the present embodiment assumes that a time schedule is created from a content display schedule, a time schedule may be stored separately.

Here, when no display device 20 is located nearby, that is, when there is no plurality of display devices near the selected location (when there are no display devices set as an advertisement group), a process of displaying a time schedule is simply executed for a display device 20 at the selected location (NO in step S150 to step S154).

In contrast, when there is a plurality of display devices near the selected location, a process of displaying multiple time schedules is executed (YES in step S150 to step S152).

Here, FIGS. 7 and 8 illustrate exemplary time schedules displayed for the user in response to the time schedule display process. FIG. 7 illustrates a display screen of a time schedule for checking whether a time frame of interest is to be excluded in accordance with time frames before and after the time frame of interest. FIG. 8 illustrates a display screen of time schedules for checking whether a time frame of interest is to be excluded additionally in accordance with nearby displays.

For example, in the case of FIG. 7, it is displayed that there is an available time frame (advertisement spot) in 14:00 to 16:00. Thus, the user can purchase the available time frame. When the user selects the available time frame (such as by clicking the available time frame), the screen proceeds to a purchase/submission system UI.

Additionally, the fee of the available time frame may be displayed, as in the present embodiment. For example, it is displayed that the available time frame can be purchased for 100,000 yen in FIG. 7.

However, as will be described later, restaurant (Chinese) and department store (sale) are registered as the attributes (categories) of content before and after the available time frame. Therefore, even in the available time frame, if content is of the same attribute, namely, restaurant (Chinese) or department store (sale), submission (reservation acceptance) of the content is not allowed.

Information that can be checked by the advertiser who checks an available time frame only includes an available time frame, fee, and attribute (such as a product category), and the advertiser is incapable of checking the actual advertisers (competitors viewed from the advertiser who is purchasing an available time frame). Note that the administrator of the management server 10 can check the actual advertisers (competitors).

Next, FIG. 8 illustrates a display screen of time schedules for checking whether a time frame of interest is to be excluded additionally in accordance with nearby displays. This is an exemplary display screen of time schedules visible from the user.

Three time schedules ("ABC square entrance column (left)", "ABC square entrance column (center)", and "ABC square entrance column (right)") in FIG. 8 are time schedules of different display devices, and the individual display devices need to be subjected to an exclusion process since they are near one another.

In the present embodiment, a display device at "ABC square entrance column (center)" has an available time frame in 14:00 to 16:00, and the advertiser can purchase this time frame.

Here, the user can purchase the available time frame for 100,000 yen; however, submission of content on restaurant (Chinese), department store, wedding hall, new film information, or an idol concert is not allowed. That is, reservation acceptance of such content is restricted and is not allowed.

Note that content on restaurant (Chinese) is displayed in 11:00 to 14:00 at both "ABC square entrance column (center)" and "ABC square entrance column (right)"; however, these items of content are of the same advertiser and are not subjected to an exclusion process, which means that purchase of the time frame of interest is not restricted, that is, is not to be excluded. Accordingly, reservation acceptance of content is allowed and reservation can be made (content can be submitted) in the available time frame.

In contrast, if a time schedule of another display device includes content of an idol concert immediately before the available advertisement spot, purchase of advertisement is restricted (excluded).

Referring back to FIG. 5, the process will be continuously described. Next, an available time frame is selected, or an end operation is performed (step S156). When an end operation is selected here, the process in FIG. 4 is executed again from the beginning (NO in step S158).

Here, when an available time frame is selected (YES in step S158), the product category of content (advertisement content) to be submitted is selected as the attribute of content (step S160). When an end operation is selected here, the process in FIG. 4 is executed again from the beginning (NO in step S162).

Here, it is determined whether the product category, which is the selected attribute of content, is not to be excluded (step S164). Submission of content to be excluded is not allowed, and reservation acceptance of such content is not allowed in the time frame. In the present embodiment, conditions for content to be excluded (exclusion conditions) are the following three conditions:

(1) In the case of a single display device 20, content is to be excluded if the content's product category is the same as or overlaps that of a time frame before or after the currently-selected time frame. That is, reservation acceptance of such content is restricted, and reservation acceptance in the selected time frame is rejected, which means that reservation acceptance is unavailable.

(2) In the case of a plurality of display devices 20, that is, in the case where there is a display device at a position near the display device of the selected time frame, content is to be excluded if the content's product category is the same as or overlaps the product category of an overlapping time frame on the nearby-positioned display device. That is, reservation acceptance of such content is restricted, and reservation acceptance in the selected time frame is rejected, which means that reservation acceptance is unavailable.

(3) In the case of a plurality of display devices 20, that is, in the case where there is a display device at a position near the display device of the selected time frame, content is to be excluded if the content's product category is the same as or overlaps the product category of an overlapping time frame and a time frame before or after the time frame of interest on the nearby-positioned display device. That is, reservation acceptance of such content is restricted, and reservation acceptance in the selected time frame is rejected, which means that reservation acceptance is unavailable.

If content corresponds to one of these exclusion conditions, the content is to be excluded. Thus, the user is asked to select the product category again (YES in step S164 to step S162). That is, the selected content (commercial) becomes restricted content, and reservation acceptance thereof is rejected.

FIG. 9A illustrates an exemplary display screen displayed for the user in this case. As illustrated in FIG. 9A, the message "Please select the product category you wish to submit." is displayed to prompt the user to select the product category.

In this manner, the advertiser (user who is trying to submit content data) can select the product category of advertisement content as the attribute of content. Here, the product category is hierarchical.

For example, "travel" serves as an upper layer, which includes "overseas travel" and "domestic travel" as lower layers. In this case, for example, when the product category "travel" is selected, the product category overlaps both "overseas travel" and "domestic travel". In addition, "overseas travel" or "domestic travel" is selected, the product category overlaps the product category "travel".

Furthermore, both "overseas travel" and "domestic travel" have "travel" as the upper layer. Therefore, it may be determined that "overseas travel" and "domestic travel" overlap each other in the product category.

When the attribute of content is not an overlapping attribute, for example, the content can be reserved as reservable content. That is, content whose attribute is different, whose attribute is not the same, or whose attribute is not in an upper-lower layer relationship is acceptable as reservable (not-to-be-excluded) content since the content does not overlap the other content.

Referring back to FIG. 5, the process will be continuously described. When the selected product category is not to be excluded (NO in step S164), content (advertisement content) to be submitted (uploaded) is selected (step S166). When an end operation is selected here, the process in FIG. 4 is executed again from the beginning (NO in step S168).

FIG. 9B illustrates an exemplary content data selecting screen in this case. By selecting content data and executing processing, the content data is sent to the management server 10 and stored there.

After the submission of the content data, it is determined whether purchase execution is finally selected. Here, by selecting purchase execution, an advertisement spot purchase process is executed.

FIG. 9C illustrates an exemplary content data purchase screen displayed to the advertiser who is the user. The details of signage, fee, file name (content data name), attribute, and time frame are individually displayed.

By selecting "purchase" in this scene, it is displayed that the selected content will be delivered in the selected time frame.

1.3.2 Content Delivery Process

Next, the content delivery process will be described with reference to FIG. 10. The content delivery process is a process executed in the case of delivering content data from the management server 10 to the display device 20, which is digital signage. The display device may be one or more. The same content data or different items of content data may be delivered to a plurality of display devices.

At first, it is determined whether there is any undelivered content data (step S202). When all items of content are already delivered to the display device 20, the process ends (YES in step S202).

When there is undelivered content data, it is determined whether content data to be delivered today is included in the undelivered content data (to-be-delivered content) (step S204). When there is content data to be delivered today (YES in step S204), the content data is delivered to the display device 20 (step S206). That is, by delivering the content data to signage software (content display program 252) running on the display device 20, content (such as advertisement content) can be displayed on the display device 20.

Here, the content data and a content display schedule, which is a schedule for displaying the content data, may be delivered to the signage software. That is, the display device 20 displays the content in accordance with the details of the content display schedule.

Next, when it is a regular delivery time (YES in step S208), content data is delivered to the signage software (step S210). At this time, a content display schedule may be additionally transmitted.

Content data is delivered at a regular delivery time in order to deliver content at night, for example, in which the network is not busy. In steps S204 and S206, content data that is unable to wait until the next delivery time point is delivered at this time point.

1.3.3 Content Display Process

Next, a content display process will be described with reference to FIG. 11. The content display process is a process executed on receipt of content data and a content display schedule from the management server 10.

That is, in response to delivery from signage management software (signage management program 152) running on the management server 10, the delivery is received from the signage management software (YES in step S302 to step S304). Accordingly, the display device 20 stores content data in the content data storage area 242, and additionally stores the content display schedule 244.

Thereafter, it is determined whether the content display schedule includes allocation of the content (step S306). Here, when the content display schedule includes allocation of the content, displaying and reproduction of the content data starts (step S308).

Here, it is determined whether it is the content end time on the content display schedule. When it is the content end time, displaying of the content ends, and the next content is displayed (YES in step S310).

According to the present embodiment as described above, a time frame for reserving content is compared with successive time frames or with an overlapping time frame of another display device, and if there is content whose attribute is the same as or includes the attribute of the to-be-reserved content, the content reservation is not available. In contrast, if only content whose attribute is different from the attribute of the to-be-reserved content is reserved in successive time frames or in an overlapping time frame of another display device, the content reservation is available in the desired time frame.

Accordingly, for example, content of the same attribute or of an overlapping attribute can be prevented from being displayed in successive time frames, or content of an overlapping attribute can be prevented from being displayed on a set display device (such as a nearby display device).

In the case of reserving content, content can be reserved when there is no content of an overlapping attribute in a time frame before or after the time frame of interest or in a time frame including the time frame of interest, thereby providing user-friendly digital signage.

Particularly in the case where the type of content is advertisement content, if a competitor's advertisement of the same attribute or a competitor's advertisement of a related attribute is displayed, a problem may occur. In the digital signage system according to the present embodiment, reservation of advertisement content causing such situations is not accepted, thereby preventing such problems from occurring.

Because a content provider such as an advertiser can be sure that the above-described failures do not occur in reservation-available time frames, a more user-friendly digital signage system can be provided.

2. Second Embodiment

Next, a second embodiment will be described.

Although it is determined in the first embodiment whether the attribute of content (such as the category of product content) is overlapping, the category is determined using a table in the second embodiment.

In the present embodiment, a to-be-excluded table 162 is stored in the memory 140. FIG. 12 illustrates an example of the to-be-excluded table 162 in the present embodiment. The to-be-excluded table 162 stores a category to be excluded with respect to a selected category.

For example, in the case where the selected category is retail stores, to-be-excluded targets are retail stores including department stores, consumer electronics retail stores, and clothing retail stores. In the case where the selected category is consumer electronics retail stores, to-be-excluded targets are department stores and consumer electronics retail stores among retail stores, but clothing retail stores are not to be excluded.

In this manner, according to the present embodiment, to-be-excluded attributes (categories) can be flexibly set. Such attributes (categories) to be excluded may be set in advance, or may be set by the administrator. Additionally, to-be-excluded attributes (categories) may be periodically updated using an external server or the like.

3. Third Embodiment

Next, a third embodiment will be described. The third embodiment will discuss the case where to-be-excluded targets are not attributes, but are time slots.

In the present embodiment, a time restriction table 164 is stored as one type of to-be-excluded table in the memory 140. FIG. 13 illustrates an example of the time restriction table 164 in the present embodiment. The time restriction table 164 stores a restricted time slot associated with the attribute of content (selected category).

For example, in the case where the selected category is "tobacco", time frames in "09:00 to 19:00 on weekdays and 09:00 to 22:00 on weekends" are to be excluded, that is, no reservation can be made in these time frames.

The time restriction table 164 may be combined with other embodiments. For example, the time restriction table 164 may be combined with the first embodiment to perform a time-slot-based exclusion process additionally in accordance with time frames before and after the time frame of interest.

4. Fourth Embodiment

Next, a fourth embodiment will be described. The fourth embodiment will discuss the case where, on a screen displaying a time schedule, regarding content display, "reservation unavailable" is displayed without displaying an attribute.

Figure 14:
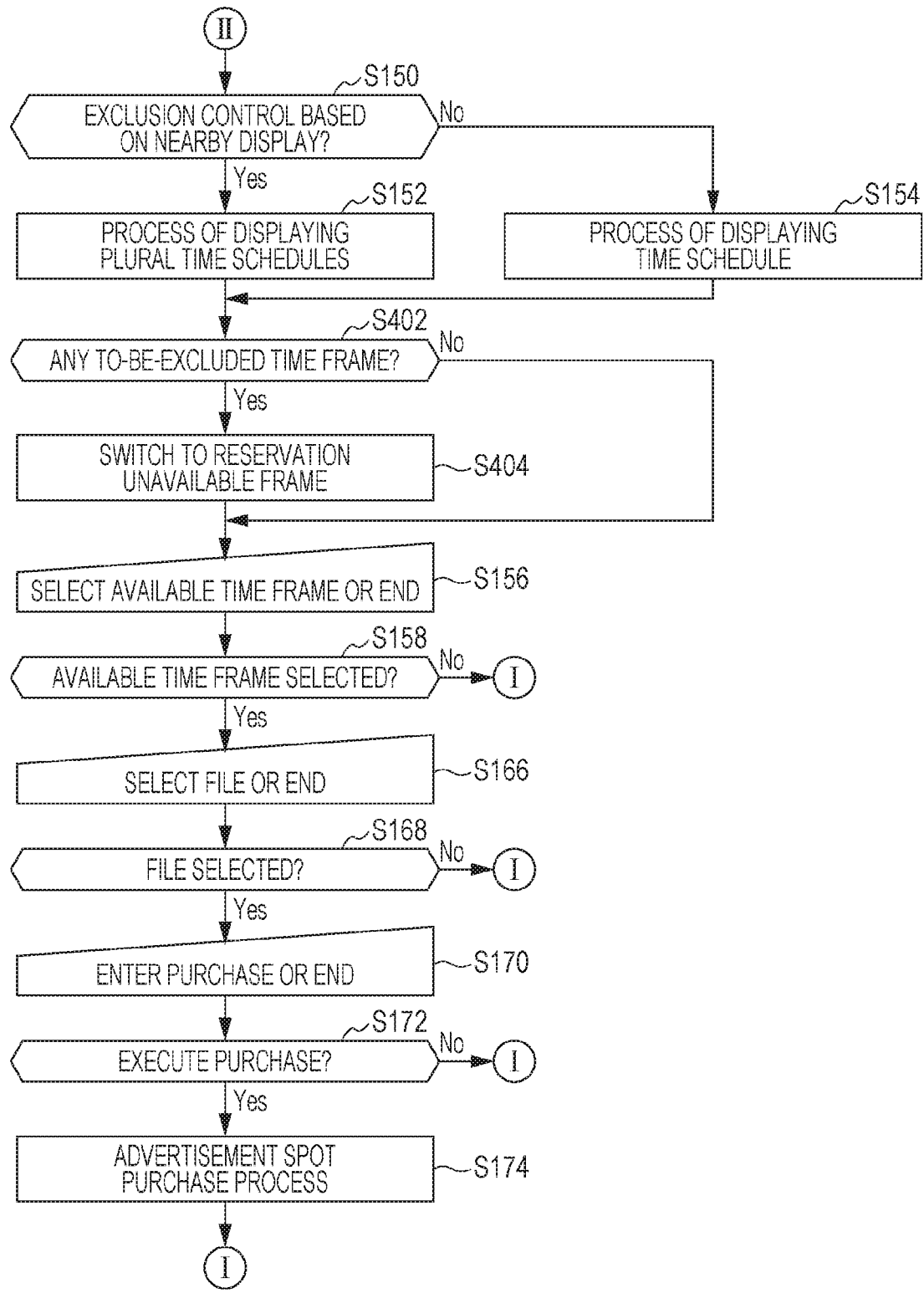
FIG. 14 illustrates an operation flow for describing a signage management system according to a fourth embodiment.

The present embodiment is an embodiment that replaces the process illustrated in FIG. 5 according to the first embodiment with a process illustrated in FIG. 14. Here, the same process as that in FIG. 5 is given the same reference numeral to omit a detailed description.

In the case of the present embodiment, the category of a user (advertiser) is registered in advance. That is, the user (advertiser) registers the category of content when using the digital signage system (when making registration for using the digital signage system).

In step S152 or step S154 in FIG. 14, one or more time schedules are displayed on the basis of a content display schedule. Here, in the case of displaying a time schedule, a time frame where content has been already reserved is displayed as "reservation unavailable" since no reservation can be made.

Next, it is determined whether there is a to-be-excluded time frame (step S402). When there is a to-be-excluded time frame, although that frame is originally an "available time frame", that frame is changed to a "reservation unavailable" frame and is displayed so (step S404).

For example, FIG. 15 illustrates an example of a display screen of time schedules according to the present embodiment. The currently available frame is "14:00 to 16:00" of "ABC square entrance column (center)".

Here, it is assumed that "11:00 to 12:00" of "ABC square entrance column (right)" is also available. However, it is assumed that content of a to-be-excluded attribute (category) in accordance with the category of the user (advertiser) has been reserved in "9:00 to 11:00" at the same location.

Since no reservation can be made in this case, this time frame is switched in advance to "reservation unavailable" and is displayed so. In doing so, it can be expected that the user (advertiser) is able to not only check that unreservable content is "reservation unavailable", but also can be prevented from notifying other users of where the content will be delivered.

5. Fifth Embodiment

Next, a fifth embodiment will be described. In the fifth embodiment, a fee for submitting content (the selling price of a time frame) is discounted depending on the time to be reserved.

In the present embodiment, a discount rate table 166, illustrated in FIG. 16, is stored in the memory 140.

The discount rate table 166 stores a fee (discount rate) associated with the time for reserving content.

For example, when two or more days are left before the delivery of content, no discount is applied; however, when the time left before the delivery of content is two days to one day, a 10% discount is applied. Likewise, when the time left before the delivery of content is one day to 12 hours, a 20% discount is applied. In this manner, a fee for submitting content is discounted in accordance with the time left before the delivery of content.

FIG. 17 illustrates an example of a display screen of a time chart according to the present embodiment. For example, it is assumed that the current time is "9:00", and an available time frame is "14:00 to 16:00". Since the time left before the available time frame is five hours, a 40% discount is applied, and "60,000 yen" is displayed as the fee.

In this manner, according to the embodiment, a fee for purchasing an available time frame is discounted in accordance with the time left before the available time frame. Accordingly, the user (advertiser) who is using the digital signage system can delivery content inexpensively.

Additionally, the system provider may be able to reduce the number of unoccupied time frames.

The time and discount rate may be set in advance, or may be arbitrarily set by the system administrator. The discount rate may be set in accordance with other factors such as the day of the week or weather.

6. Sixth Embodiment

Next, a sixth embodiment will be described. Although a to-be-excluded target is determined on the basis of the attribute of content in the above-described embodiments, user information (such as an attribute regarding the advertiser, and the company name) is further provided in the present embodiment, and a to-be-excluded target may be determined on the basis of the user information.

Here, when user information on a user who wishes to reserve content is contained in information on the user of content reserved in a time frame before or after the time frame of interest, even if the content's attribute is included, the content may be reserved.

For example, the case of applying the present embodiment to the first embodiment will be described. When the attribute of to-be-reserved content overlaps the attribute of content reserved in a time frame before or after the time frame of interest, the content of interest is unreservable in the first embodiment.

However, in the case of the present embodiment, when the attribute of to-be-reserved content overlaps the attribute of content reserved in a time frame before or after the time frame of interest, user information is checked next. Here, when the user of the to-be-reserved content is the same as the user of content reserved in a time frame before or after the time frame of interest or when the two users belong to the same group of companies, the content of interest can be reserved.

Like the above-described embodiments, user information may be used to determine the case where content is unreservable. For example, no reservation is available in the case of companies in the same field or in the case where the user shares information on a company that competes with the digital signage providing facility.

7. Advantages

According to the above-described embodiments, receipt of content and creation of a content display schedule (calendar schedule and time schedule) in accordance with the receipt details, which have been previously done by a location owner (administrator), are automatically performed in response to an operation performed by a user (advertiser). Accordingly, the load on the administrator can be alleviated, thereby preventing human error.

Because previous tasks can be automated, advertisement spots can be sold until the very last minute, and, as a result, it can be expected that the number of unsold advertisement spots can be reduced. Because advertisement spots are sold until the very last minute, the price can be changed at the last minute to promote sales.

Content reproduction conditions and fees are explicitly presented to the advertiser. This enhances the convenience of the advertiser, and the advertiser and the location owner can exchange the contract details until the very last minute. As a result, it can be expected that the number of unsold advertisement spots can be reduced.

8. Modifications

Although the embodiments have been described in detail with reference to the drawings, the specific configurations are not limited to those in the embodiments, and designs and the like not departing from the scope of the gist of the disclosure are also included in the scope of claims.

Needless to say, the above-described embodiments can be combined and executed. For example, the first, second, and fifth embodiments can be combined and executed.

A program running on each apparatus according to the embodiments is a program controlling a CPU or the like to realize the functions of the embodiments (a program causing a computer to function as the functions of the embodiments). Information handled by these apparatuses is temporarily accumulated at the time of its processing in a temporary storage device (such as random-access memory (RAM)), and then stored in a storage device such as a hard disk drive (HDD) or a solid-state drive (SSD). As occasion demands, the information is read by the CPU and modified or written.

To distribute the program in the market, the program can be stored in a portable recording medium and distributed, or transferred to a server computer connected via a network such as the Internet. In this case, needless to say, a storage device of the server computer is included in the present disclosure.

The present disclosure contains subject matter related to that disclosed in Japanese Priority Patent Application JP 2016-188708 filed in the Japan Patent Office on Sep. 27, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content management apparatus that manages a content display schedule specifying a time frame for displaying content on a display device, the apparatus comprising:
 a memory; and
 a controller in communication with the memory; wherein the controller executes a program stored on the memory to:
  reserve content to be displayed in an available time frame of the content display schedule;
  store the content display schedule including the reserved content;
  determine whether an attribute of the content overlaps an attribute of other content reserved on each display device arranged side-by-side among a plurality of display devices which are installed in adjacent locations in a time frame before or after the time frame when the content is reserved;
  accept reservation of the content when the attribute of the content does not overlap the attribute of the other content in the time frame before or after the time frame when the content is reserved; and determine whether the attribute of the content overlaps the attribute of other content reserved in a same time frame on each display device arranged side-by-side among the plurality of display devices which are installed in adjacent locations; and the controller selectively prevents accepting reservation of the content when the attribute of the content overlaps the attribute of the other content reserved in the same time frame.

2. The content management apparatus according to claim 1, wherein:

the display devices arranged side-by-side among the plurality of display devices are set as an advertisement group.

3. The content management apparatus according to claim 1, wherein:

the controller displays a time schedule based on the content display schedule; and the controller displays, in a time frame where the content is reserved, the attribute of the content.

4. The content management apparatus according to claim 3, wherein the controller displays that no reservation is available in the time frame where the content is reserved.

5. The content management apparatus according to claim 3, wherein the controller displays that no reservation is available when the attribute of the content overlaps the attribute of the other content in the time frame before or after the time frame where the content is reserved.

6. A content management apparatus that manages a content display schedule specifying a time frame for displaying content on a display device, the apparatus comprising:

a memory; and a controller in communication with the memory; wherein the controller executes a program stored on the memory to:

display a time schedule that displays content on the display device, on a basis of the content display schedule that is stored in the memory;

display, in the time schedule, one or more available time frames in which content to be displayed on the display device can be reserved as one or more reservation-available time frames;

reserve the content in one of the one or more reservation-available time frames;

prevent accepting reservation of one of the one or more reservation-available time frames that displays the content when an attribute of the content overlaps an attribute of other content in a time frame before or after the one of the one or more reservation-available time frames; and determine whether the attribute of the content overlaps the attribute of other content reserved in a same time frame before or after the one of the one or more reservation-available time frames on each display device arranged side-by-side among a plurality of display devices which are installed in adjacent locations.

7. A content display system comprising:

a plurality of display devices; and a content management apparatus, wherein:

the content management apparatus includes:

a transmitter;

a memory; and a controller in communication with the memory;

the controller executes a program stored on the memory to:

manage content display schedules, each of the content display schedules specifying a time frame for displaying content of each of the plurality of display devices, to store the content display schedules in the memory;

reserve a first content to be displayed in an available time frame of one of the content display schedules; and determine whether an attribute of the first content overlaps an attribute of other content reserved on each display device arranged side-by-side among the plurality of display devices which are installed in adjacent locations in a time frame before or after the time frame where the first content is reserved; and the transmitter transmits the first content and the other content to the plurality of display devices in accordance with the each of the content display schedules for each of the plurality of display devices in the memory;

the controller receives the content and displays the content on each display device arranged side-by-side among the plurality of display devices installed in adjacent locations;

the controller accepts a reservation of the first content when the attribute of the first content does not overlap the attribute of the other content; and the controller determines whether the attribute of the first content overlaps the attribute of other content reserved in a same time frame, on each display device arranged side-by-side among the plurality of display devices, and selectively prevents accepting reservation of the first content when the attribute of the first content overlaps the attribute of the other content in the same time frame.

8. A content reservation method for a content management apparatus that manages a content display schedule specifying a time frame for displaying content on a display device, the method comprising:

reserving content to be displayed in an available time frame of the content display schedule;

storing in a memory the content display schedule including the content reserved in the reserving;

determining whether an attribute of the content overlaps an attribute of other content reserved in a time frame before or after the time frame where the content is reserved, wherein, in the reserving, reservation of the content is accepted in response to a determination in the determining that the attribute of the content does not overlap the attribute of the other content reserved in the time frame before or after the time frame where the content is reserved, on each display device arranged side-by-side among the plurality of display devices installed in adjacent locations; and selectively preventing accepting reservation of the content in response to determining that the attribute of the content overlaps the attribute of the other content reserved in the time frame before or after the time frame where the content is reserved.

9. A content reservation method for a content management apparatus that manages a plurality of time schedules for displaying content on a plurality of display devices, the method comprising:

displaying a time schedule for displaying content on one of the plurality of display devices, on a basis of the time schedule that is stored in a memory;

displaying, in the time schedule, one or more available time frames in which content to be displayed on the one of the plurality of display devices can be reserved as one or more reservation-available time frames; and reserving the content in a reservation-available time frame of the one or more reservation-available time frames, wherein, in the displaying one or more available time frames, selectively preventing accepting reservation of the content when an attribute of the content overlaps an attribute of other content reserved in a time frame before or after the reservation-available time frame on each display device arranged side-by-side among the plurality of display devices which are installed in adjacent locations.

* * * * *